(12) United States Patent
Osborne et al.

(10) Patent No.: US 7,752,411 B2
(45) Date of Patent: Jul. 6, 2010

(54) CHIPS PROVIDING SINGLE AND CONSOLIDATED COMMANDS

(75) Inventors: Randy B. Osborne, Beaverton, OR (US); Shelley Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 11/491,312

(22) Filed: Jul. 21, 2006

(65) Prior Publication Data

US 2007/0150688 A1    Jun. 28, 2007

Related U.S. Application Data

(63) Continuation-in-part of application No. 11/318,028, filed on Dec. 23, 2005.

(51) Int. Cl.
G06F 12/00 (2006.01)
G06F 13/00 (2006.01)
G06F 13/28 (2006.01)

(52) U.S. Cl. .......................... 711/168; 710/35; 710/39; 370/235

(58) Field of Classification Search ................ 711/168; 710/39, 35; 370/235
See application file for complete search history.

(56) References Cited

U.S. PATENT DOCUMENTS

| | | | | |
|---|---|---|---|---|
| 4,924,381 | A * | 5/1990 | Tokuume | 711/106 |
| 5,948,081 | A * | 9/1999 | Foster | 710/40 |
| 5,991,819 | A | 11/1999 | Young | |
| 6,023,745 | A * | 2/2000 | Lu | 711/5 |
| 6,098,133 | A * | 8/2000 | Summers et al. | 710/107 |
| 6,273,759 | B1 | 8/2001 | Perino et al. | |
| 6,304,133 | B1 * | 10/2001 | Sato | 327/552 |
| 6,430,683 | B1 * | 8/2002 | Arimilli et al. | 712/245 |
| 6,470,433 | B1 * | 10/2002 | Prouty et al. | 711/168 |
| 6,615,326 | B1 | 9/2003 | Lin | |
| 6,674,648 | B2 | 1/2004 | McCall et al. | |
| 6,766,385 | B2 | 7/2004 | Dodd et al. | |
| 6,785,190 | B1 | 8/2004 | Bains et al. | |
| 6,831,924 | B1 | 12/2004 | Cornett et al. | |

(Continued)

FOREIGN PATENT DOCUMENTS

EP    1241580    9/2002

(Continued)

OTHER PUBLICATIONS

Amendement dated May 29, 2008 for U.S. App. No. 11/318,028.

(Continued)

*Primary Examiner*—Stephen C Elmore
*Assistant Examiner*—Mark A Giardino, Jr.
(74) *Attorney, Agent, or Firm*—Derek J. Reynolds

(57) ABSTRACT

In some embodiments, a chip includes a link interface, monitoring circuitry to provide an activity indicator that is indicative of activity of the chip, and scheduling circuitry to schedule commands. The chip also includes mode selection circuitry to select a first mode or a second mode for the scheduling circuitry depending on the activity indicator, wherein in the first mode the scheduling circuitry schedules certain commands as separate single commands and in the second mode the scheduling circuitry schedules at least one consolidated command to represent more than one of the separate single commands. Other embodiments are described.

21 Claims, 6 Drawing Sheets

U.S. PATENT DOCUMENTS

| | | |
|---|---|---|
| 6,877,071 B2 | 4/2005 | Sherman |
| 6,954,822 B2 | 10/2005 | Bains et al. |
| 6,961,831 B2 | 11/2005 | Ware et al. |
| 7,024,518 B2 | 4/2006 | Halbert et al. |
| 7,043,599 B1 * | 5/2006 | Ware et al. ................ 711/106 |
| 2002/0023191 A1 | 2/2002 | Fudeyasu |
| 2003/0217223 A1 | 11/2003 | Nino et al. |
| 2004/0236921 A1 | 11/2004 | Bains |
| 2005/0071536 A1 | 3/2005 | Osborne |
| 2005/0071541 A1 | 3/2005 | Osborne |
| 2005/0091460 A1 | 4/2005 | Rotithor et al. |
| 2005/0108469 A1 | 5/2005 | Freeman et al. |
| 2005/0144375 A1 | 6/2005 | Bains et al. |
| 2006/0190669 A1 | 8/2006 | Lee et al. |

FOREIGN PATENT DOCUMENTS

| | | |
|---|---|---|
| WO | WO 00/34875 | 6/2000 |

OTHER PUBLICATIONS

Office action dated Feb. 5, 2008 for U.S. App. No. 11/318,028.

\* cited by examiner

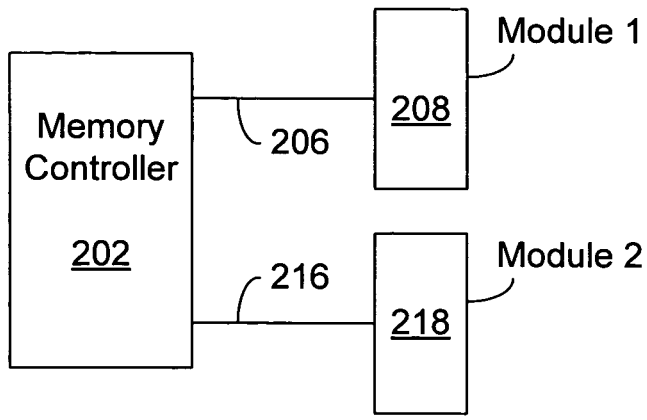
FIG. 15
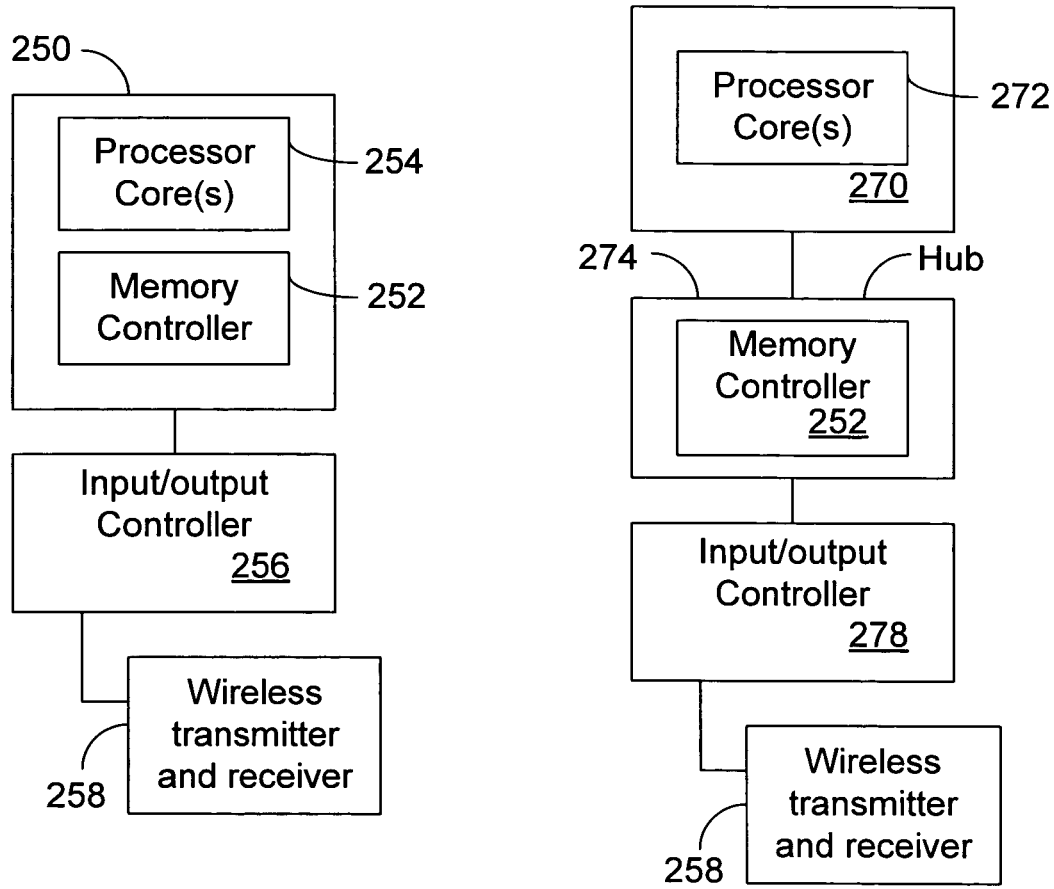
FIG. 16
FIG. 17

CHIPS PROVIDING SINGLE AND CONSOLIDATED COMMANDS

RELATED APPLICATION

The present application is a continuation-in-part of application Ser. No. 11/318,028, filed Dec. 23, 2005, pending.

BACKGROUND

1. Technical Field

Embodiments of the inventions relate to systems in which a chip dynamically changes between a first mode in which the chip provides certain commands as separate single commands and a second mode in which the chip provides a consolidated command that represents more than one of the separate single commands.

2. Background Art

Various arrangements for memory devices in a memory system have been proposed. For example, in a typical synchronous dynamic random access memory (SDRAM) system, memory devices communicate data through bidirectional data buses and receive commands and addresses through command and addresses buses. The memory devices have stubs that connect to the buses in a multi-drop configuration (coupling three or more points). Other designs include point-to-point signaling (coupling two points). The point-to-point signaling may be unidirectional or bidirectional. The signaling may be single ended or differential. In some systems, address, command, and write data may be on the same conductors.

Memory controllers provide various commands to memory devices. These commands include an activate command (ACT), a precharge command (PRE), a read command (RD), and a write command (WR). Read and write commands are sometimes called CAS commands.

Memory modules include a substrate on which a number of memory devices are placed. The memory devices may be placed on only one side of the substrate or on both sides of the substrate. In some systems, a buffer is also placed on the substrate. For at least some signals, the buffer interfaces between the memory controller (or another buffer) and the memory devices on the module. In such a buffered system, the memory controller can use different signaling with the buffer than the buffer uses with the memory devices. A dual in-line memory module (DIMM) is an example of a memory module. Multiple modules may be in series and/or parallel. A system may include one or more than one memory channel.

Some computer systems having included some memory devices on a motherboard and other memory devices on a memory module or other card in a connector on the motherboard.

In some memory systems, the memory devices receive signals and repeat them to other memory devices as well as provide requested data signals to next memory devices. Read data signals can be provided to the memory controller through a point-to-point unidirectional return link from the last memory device in a series of memory devices in a looped fashion or from a memory device that is not the last memory device in the series.

Memory controllers have been used in chipset hubs and in a chip that includes a processor core. Some computer systems include wireless transmitter and receiver circuits.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

FIGS. 13-17 are each a block diagram representation of a system according to some embodiments of the inventions.

DETAILED DESCRIPTION

Some embodiments of the invention include mode selection circuitry to select a first mode or a second mode for the scheduling circuitry depending on an activity indicator. In the first mode, the scheduling circuitry schedules certain commands as separate single commands and in the second mode the scheduling circuitry schedules at least one consolidated command to represent more than one of the separate single commands.

In different embodiments, the activity indicator represents different activity of the chip. Examples of the activity include the number of scheduled commands per unit time, the number of signals being transmitted onto a link per unit time, and the fullness of a write request queue.

Figure 1:
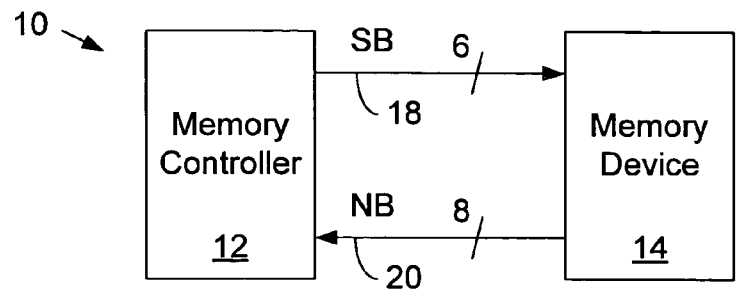
FIG. 1 is a block diagram representation of a system including a memory controller and a memory device according to some embodiments of the inventions.

Referring to FIG. 1, a system 10 includes a memory controller 12 and a memory device 14. In the particular embodiments of FIG. 1, signals are carried from memory controller 12 to memory device 14 through a unidirectional point-to-point link 18, and from memory device 14 to memory controller 12 through a unidirectional point-to-point link 20. In some embodiments, the signals on link 18 include command, address, and write data signals and the signals on link 20 are read data. As examples, link 18 includes six conductor lanes and link 20 includes eight conductor lanes, each of which may have one conductor (or two conductors with differential signaling). As a convention, signals from memory controller 12 to memory device 14 are said to be south bound (SB) and signals from memory device 14 to memory controller 12 are said to be north bound (NB), but this convention is not required. Memory device 12 may be a DRAM or other type of memory device.

Different embodiments of memory controller 12 provide different commands to memory device 14. These commands include single commands (a single activate command (ACT), a single precharge command (PRE), a single read command (RD), a single write command (WR)) and consolidated commands (a consolidated activate/read command (ACT/RD), a consolidated activate/write command (ACT/WR), a consolidated precharge/activate command (PRE/ACT), but not all of these commands is required in every embodiment. In some embodiments, there may be additional single and consolidated commands such as one or more of the following: PRE/ACT/RD, PRE/ACT/WR, ACT/WR/RD, and ACT/RD/WR. Read and write commands are sometimes referred to as CAS commands so the ACT/RD and ACT/WR commands can be more generally referred to as ACT/CAS commands.

In the example of FIG. 1, a reason why more lanes are dedicated to read data than the command, address, write data is that it is desirable to keep the total number of lanes below a particular number and most applications tend to be more read intensive than write intensive. However, in some cases, the available bandwidth (BW) for the SB link 18 can be severely limited. A way to free up capacity for link 18 is to provide consolidated commands.

An advantage of single commands is that they are more likely to be optimally scheduled. (In this context, "optimal" does not necessarily mean a mathematical optimum, but means at least generally close to a mathematical optimum.) In some embodiments, with just in time (JIT) scheduling, the command order can be determined at a later time or even the latest possible time, usually resulting in an optimal or at least improved schedule. In addition, with JIT scheduling, there may be more flexibility in scheduling around memory device core timing constraints. Unfortunately, a potential downside to having these single commands is that command traffic on link 18 may be increased, thus decreasing the available write data BW and, in some cases, accentuating the write BW limitation problem.

To help with this problem, scheduling circuitry 32 may, at least in some situations, schedule single commands when write data traffic will not be particularly high and schedule consolidate commands when write data traffic will be particularly high.

Figure 2:
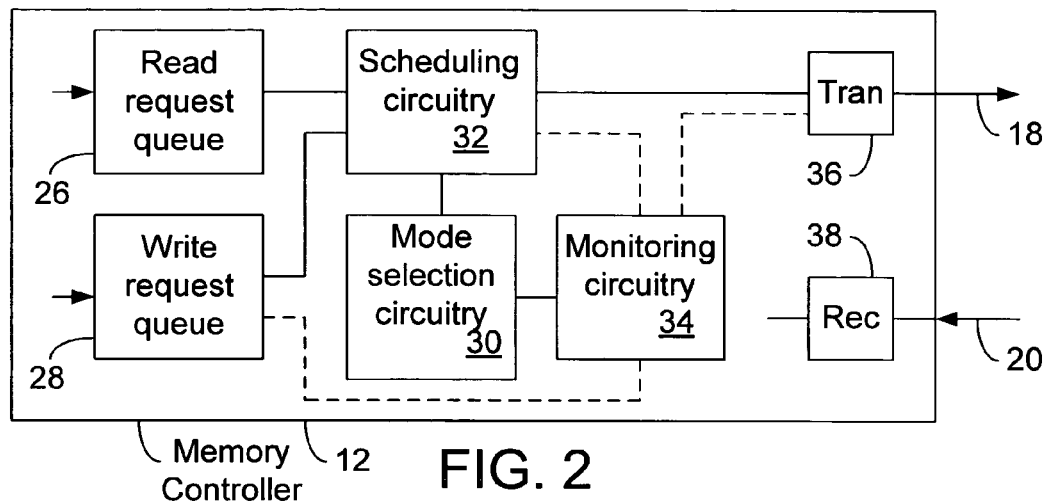
FIG. 2 is a block diagram representation of some details of the memory controller of FIG. 1 according to some embodiments of the inventions.

FIG. 2 illustrates some details that are included in some embodiments of memory controller 12, but the inventions are not limited to these details. FIG. 2 includes a read request queue 26 and a write request queue 28. Read requests from read request queue 26 and write requests from write request queues 28 are provided to scheduling circuitry 32 which may schedule read and write commands for memory device 14 in response to these requests. Mode selection circuitry 30 decides whether scheduling circuitry 32 should be in the first or second mode based at least in part on activity of the chip. In the first mode, scheduling circuitry 32 schedules activate and read commands as separate single commands, and activate and write commands as separate single commands. In the second mode, scheduling circuitry 32 schedules corresponding consolidated activate/read and activate/write commands. Commands scheduled by scheduling circuitry 32 are provided by transmitters 36 to link 18. Transmitters 36 are an example of a link interface to link 18. Memory controller 12 also includes receivers 38 to receive signals on link 20. There may be additional modes. For example, in a third mode, there may be additional consolidated commands that are not provided in the second mode, or alternatively fewer of the consolidated commands are used.

In some embodiments, memory controller 12 includes monitoring circuitry 34. Monitor circuitry 34 monitors an activity of the chip that includes memory controller 12 and provides an activity indicator that is indicative of the activity. In different embodiments, monitor circuitry 34 interfaces with different circuits. Dashed lines show different possibilities for different embodiments. For example, in some embodiments, monitoring circuitry 34 monitors signals associated with scheduling circuitry 32, in other embodiments monitoring circuitry 34 monitors signals associated with transmitters 36, and in yet other embodiments monitoring circuitry 34 monitors signals associated with write request queue 28. In still other embodiments, monitoring circuitry 34 could monitor signals associated with other circuitry and/or a combination of scheduling circuitry 32, transmitters 36 and/or write request queue 28.

The activity indicator provided by monitoring circuitry 34 may be a single signal such as a single bit or a multi-bit number, or it may a combination of signals indicating different aspects of the signals associated with the circuits. In some embodiments, monitoring circuitry 34 provides the activity indicator directly to mode selection circuitry 30 and in other embodiments, there is intermediate circuitry.

The following are some examples of monitored activities and provided activity indicators. As examples, in some embodiments, monitoring circuitry 34 estimates link utilization through one or more of the following: (1) monitoring link utilization through, for example, using a moving average window filter, (2) monitoring write queue occupancy, (3) monitoring read and write queue occupancy, and (4) monitoring a time interval since the last command (most recently scheduled command) to be on the link. The activity indicator could be indicative of the number of signals scheduled to be transmitted per unit time or during a particular sampling period of time. The activity indicator could be indicative of signals that are actually being transmitted onto link 18. The signals could include merely commands or also addresses and write data. Accordingly, monitoring circuitry 34 may make an estimate based on a subset of signals (such as commands) or monitor all of the signals. Monitoring circuitry 34 may count packets transmitted on the link at a particular time or per unit time or during a particular period of time. A sliding window could be used. Different commands or other scheduled activity could be given the same weight or different weight in calculating the activity amount. Monitoring circuitry 34 could count all the signals transmitted on link 18 and how many bits each involves to come up with a total number of bits per unit time. Some embodiments use a combination of scheduled and actual signals. Still other approaches may be used.

In different embodiments, memory controller 12 uses different approaches to decide whether to be in the first or second mode. For example, in some embodiments, mode selection circuitry 30 compares the activity indicator provided by activity monitor 34 to a threshold amount. If the activity indicator has a first relationship with the threshold (for example, greater than or greater than or equal to), the first mode is selected and scheduling circuitry 32 schedules certain separate commands. If the activity indicator has a second relationship with the threshold (for example, less than or less than or equal to), the second mode is selected and scheduling circuitry 32 schedules certain consolidated commands. In another approach, mode selection circuitry 30 selects the first mode if the activity indicator is in a first range and the second mode if the activity indicator is in a second range. The ranges may overlap or meet at a single threshold. The number of scheduled commands, write requests, or link activity may rapidly go above and below a threshold. In some embodiments, there is more than one threshold (overlapping ranges). For example, there may be one threshold to switch from the first to the second mode and another threshold to switch from the second to the first mode. Other criteria and approaches may be used. For example, if the activity indicator is in a third range, the chip may be in a third mode in which, for example, additional or fewer consolidated commands are used.

Figure 3:
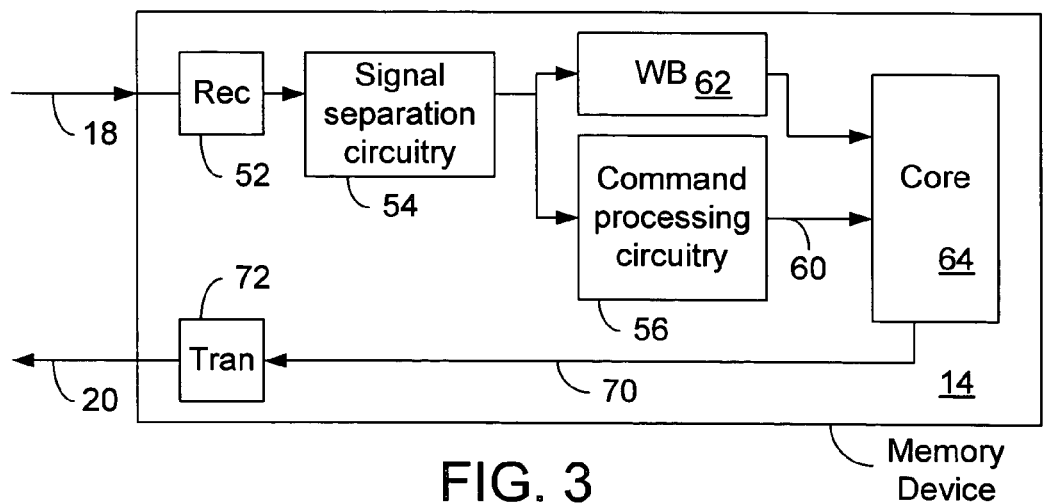
FIG. 3 is a block diagram representation of some details of the memory device of FIG. 1 according to some embodiments of the inventions.

FIG. 3 illustrates details of memory device 14 according to some embodiments, although the inventions are not limited to these details. In FIG. 3, signals from link 18 are received by receivers 52 and provided to signal separation circuitry 54. Write data are provided to write buffer 62 and commands are provided to command processing circuitry 56. Write buffer 62 may be used as follows. In some protocols, for a write request, the write data are first provided. A write command and address are thereafter provided. The write data stays in write buffer 62 until an associated command and address causes it to be written into core 64 (or repeated to a next memory device (see FIG. 13)). Core 64 may include multiple banks and various other circuitry such as decoders. Decoders may also be included before core 64. Some embodiments do not include a write buffer to hold write data in this manner.

Core 64 returns read data to internal data link 70. Transmitters 72 receive read data from link 70 and provide it to external link 20.

Figure 4:
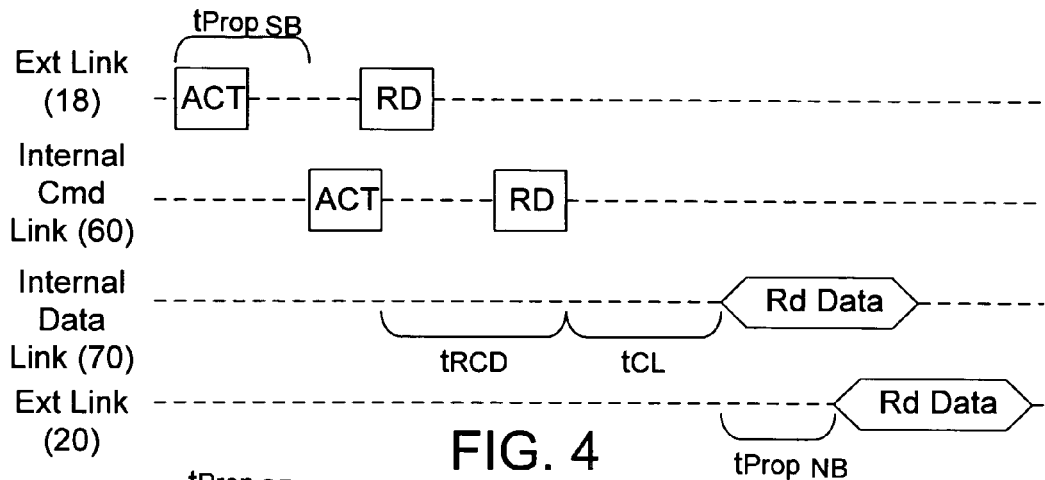
FIGS. 4 and 5 are each a timing diagram illustrating some aspects of some embodiments of the inventions.
Figure 5:
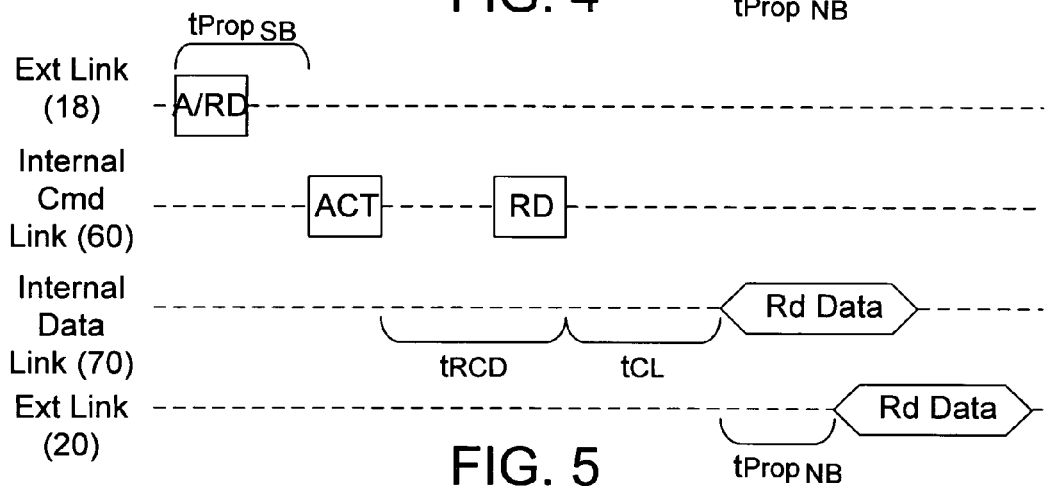

If a particular received command is a single activate, a single read command, or a single write command, then command processing circuitry 56 provides the particular command to core 64 as a single command. However, if the read or write command is a consolidated command, then command processing circuitry 56 translates the consolidated command into two single commands to be provided to core 64. FIGS. 4 and 5 provides examples of these, but the inventions are not limited to the details of FIGS. 4 and 5.

FIG. 4 illustrates the case in which two single commands (ACT and RD) are provided on external link 18. A time tPropSB later they are provided to internal command link 60. Because they are two single commands, command processing circuitry 56 passes them through. A time tRCD is the minimum amount of time between an Activate and a Read command. A time tCL is the time between core 64 receiving a read command and the time the read data are put on internal data link 70. A time tpropNB is the time from when the read data are put on internal data link 70 to the time they are received by memory controller 12 through external data link 20. Note that the relative lengths of tRCD, tCL, tpropNB, the commands, and read data were chosen for convenience in creating FIG. 4 and are not intended to be accurate.

FIG. 5 illustrates the case in which a consolidated command ACT/RD is provided on external link 18. Command processing circuitry 56 translates consolidated command ACT/RD into two single commands ACT and RD and provides them to internal data link 60. The read data are then provided by core 64 to internal link 70 as in FIG. 4. In some embodiments, each separate command of FIG. 4 occupies one command frame. In some embodiments, any command frame not occupied by a command may have write data scheduled into it.

In addition to providing more available frames on link 18, proper use of consolidated commands may reduce the overall input/output power of the memory device. However, as mentioned, using consolidated commands can result in sub-optimal scheduling, which in turn can result in more commands being scheduled. The problem arises when the ACT and CAS commands are scheduled at the same time on link 18. The ACT command part is still scheduled JIT, but the CAS part is scheduled tRCD prior to when it would have been scheduled with JIT scheduling. By the time tRCD clocks have passed, scheduling the CAS may not be optimal anymore. The sub-optimal schedule can actually increase the number of commands as opposed to decreasing it. For example, for a non-optimal schedule, more page misses may occur, which would result in more ACT commands. This would, in turn, restrict write bandwidth even more. In addition, in some embodiments, the ACT and CAS must be received at least tRCD apart. Thus, with these constraints, the only way to schedule the ACT is if the memory controller can schedule both the ACT at one time and the CAS at least tRCD later. Scheduling two commands at a time is less likely to be optimal than scheduling just one command.

The demand-based scheduler described herein can switch between scheduling single commands and consolidated commands. In some embodiments, the demand may be based on the amount of write BW needed by the currently running workload, which may be determined by the instantaneous number of scheduled commands, link activity, depth of the write request queue, or other activity. When the write BW surpasses a certain threshold, the memory controller may begin scheduling consolidated commands. Otherwise, it will schedule only single commands. Thus, for read intensive applications, the needed write BW will be very low and the depth of the write request queue will be small, so the scheduler may schedule single commands. However, for write-intensive applications where the system is usually write BW limited with single commands, the write request queue will tend to become full, and the memory controller will begin consolidating commands attempting to allow for higher write BW.

The adaptive consolidation scheduling protocol may allow taking advantage of the power and command BW savings provided by consolidated commands without leaving as much performance on the table. If only the consolidated commands are scheduled, then performance may be reduced because consolidated commands are less likely to be optimally scheduled. If only single commands are scheduled, then performance may be reduced because of potential limited write BW. The adaptive consolidation algorithm attempts to resolve both of these shortcomings by only consolidating based of the measured or predicted write BW.

The addresses for the commands of FIGS. 4 and 5 may be provided in packets with the commands or they may be provided separately. Write data may be provided in packets with the commands, although that is not required. If write data are provided in packets with commands, the command is not necessarily for that write data.

The operation of the memory device 14 with single or consolidated write commands is similar to that of FIGS. 4 and 5 except that read data are not provided from core 64 in response to a write command and, in some embodiments, the write data are provided to write buffer 62 before the associated write commands are provided.

Figure 6:
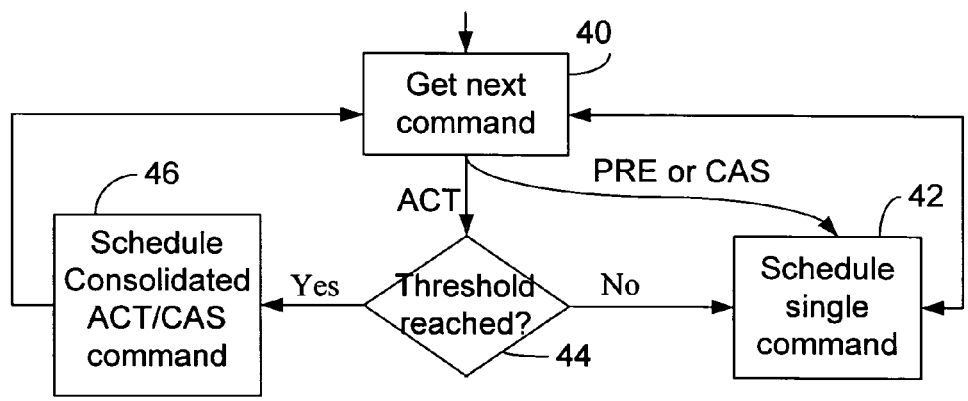
FIG. 6 is a flow chart illustrating some aspects of some embodiments of the inventions.

FIG. 6 is a flow chart illustrating some aspects of memory controller 12 in some embodiments. In other embodiments, memory controller 12 may operate somewhat differently. Referring to FIG. 6, scheduling circuitry 32 considers the next command to schedule (box 40). If the next command is a precharge command, or a CAS command (read or write) with a page hit, then scheduling circuitry 32 schedules the precharge, read, or write command as a single command. If the next command to consider is an activate command, it means that a read or write command will follow. In that case, if memory controller 12 is in the first mode, scheduling circuitry 32 schedules the activate as a single command (box 42) and if memory controller 12 is in the second mode, scheduling circuitry 32 schedules the activate as part of a consolidated command (ACT/RD or ACT/WR) (box 46). Decision box 44 represents the decision as to whether to place memory controller 12 in the first or second mode.

Figure 7:
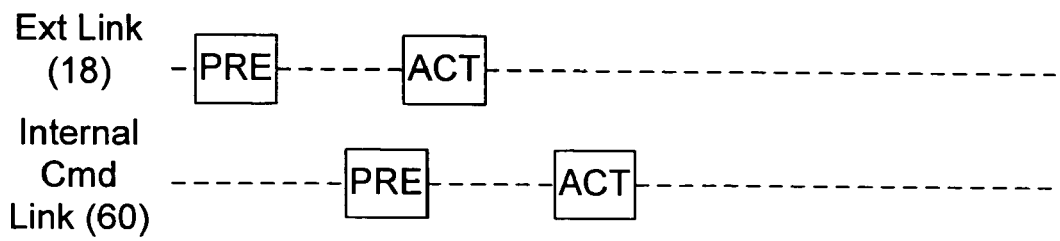
FIGS. 7 and 8 are each a timing diagram illustrating some aspects of some embodiments of the inventions.
Figure 8:
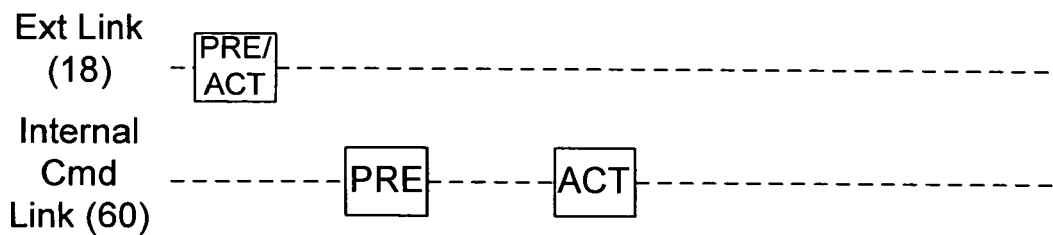

FIG. 7 is a timing diagram illustrating another option of consolidation. In FIG. 7, two single commands (PRE and ACT) are provided on external link 18. These commands are also provided on internal command link 60 some time later. FIG. 8 is a timing diagram illustrating the case in which a consolidated command (PRE/ACT) is provided on external link 18, but two separate commands PRE and ACT are provided on internal command link 60 some time later. The various timings on FIGS. 4, 5, 7, and 8 are merely illustrative and not necessary in all embodiments.

Figure 9:
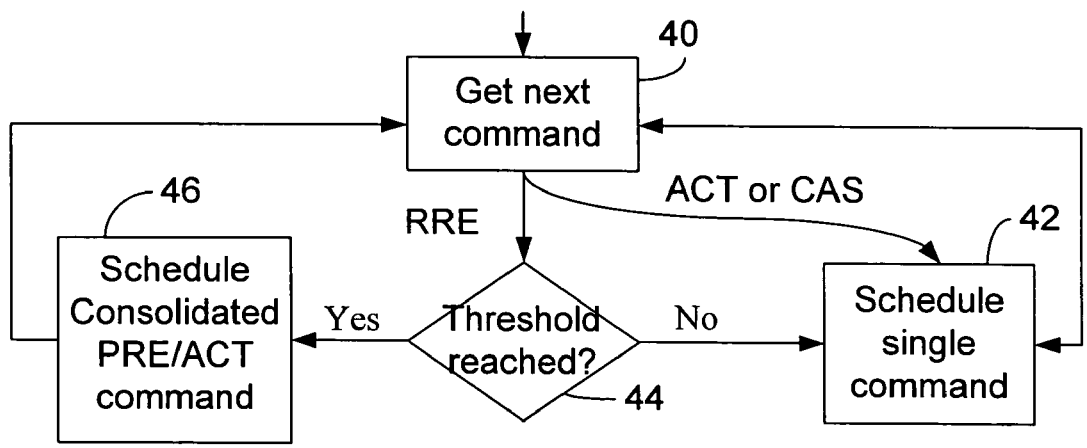
FIG. 9 is a flow chart illustrating some aspects of some embodiments of the inventions.

FIG. 9 is a flow chart illustrating some aspects of memory controller 12 in some embodiments. Scheduling circuitry 32 considers the next command to schedule (box 40). If the next command is an ACT or CAS command, then scheduling circuitry 32 schedules the ACT or CAS (read or write) as a single command. If the next command to consider is a precharge command, it means that an activate command will follow. In that case, if memory controller 12 is in the first mode, scheduling circuitry 32 schedules the precharge as a single command (box 42) and if memory controller 12 is in the second mode, scheduling circuitry 32 schedules the activate as part of a consolidated command (PRE/ACT) (box 46). Decision box 44 represents the decision as to whether to place memory controller 12 in the first or second mode. The details of FIG. 9 are not involved in some embodiments.

Another way mode selection circuitry 30 can decide whether scheduling circuitry 32 is to be in the first or second mode is to compare a threshold with the fullness of write request queue 28. In some embodiments, if the number of write requests in write request queue 28 has a first relationship to the threshold, then mode selection circuitry 30 has scheduling circuitry 32 be in the first mode. If the number of write requests in queue 28 has a second relationship to the threshold, then mode selection circuitry 30 has memory controller 12 be in the second mode. Mode selection circuitry 30 may use other approaches in deciding which mode memory controller 12 should be in. For example, mode selection circuitry 30 could monitor the number of queue spaces that are not occupied with a valid write request, rather than the number of spaces that are occupied. In such a case, the first and second relationships would be different.

Still other approaches could be used. For example, if there is more than one type of write request, mode selection circuitry 30 could give different weight to different instructions. For example, in some embodiments mode selection circuitry 30 could weight write requests differently depending on whether they will involve a page miss or page hit. Again, there can be one or two thresholds with a weighted system. In some embodiments, mode selection circuitry 30 might consider other factors such as the heat of memory device 14 in deciding the mode. In some embodiments, scheduling circuitry 32 is in the first mode as a default condition.

Figure 10:
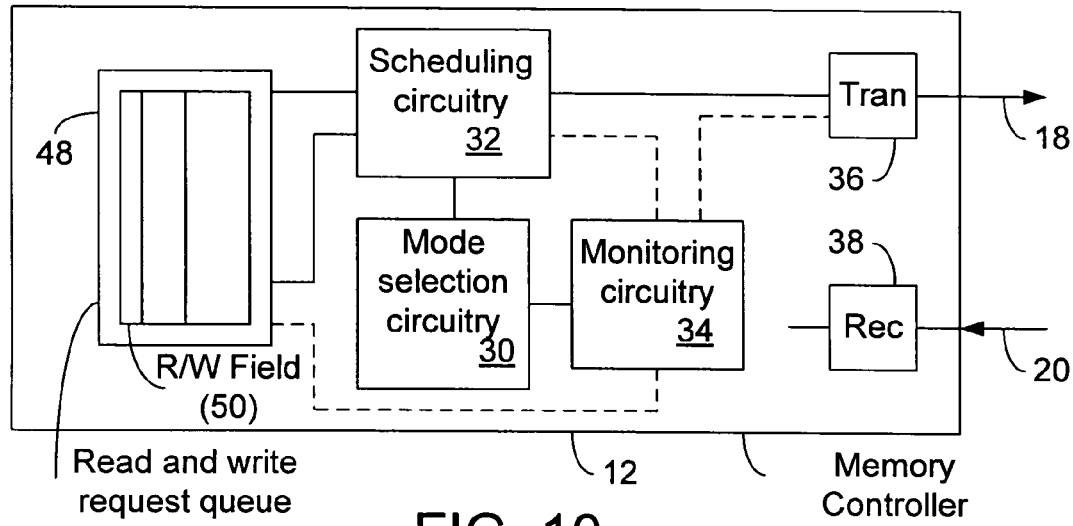
FIGS. 10 and 11 are each a block diagram representation of a memory controller according to some embodiments of the inventions.

FIG. 10 is like FIG. 2 except as follows. FIG. 10 includes a combined read and write request queue 48 that includes a read/write field 50. In these embodiments, mode selection circuitry 30 may consider how many write requests are in queue 48 based on the contents of field 50 for valid entries in queue 48. Other approaches may be used. Mode selection circuitry 30 may receive signals directly from queue 28.

Figure 11:
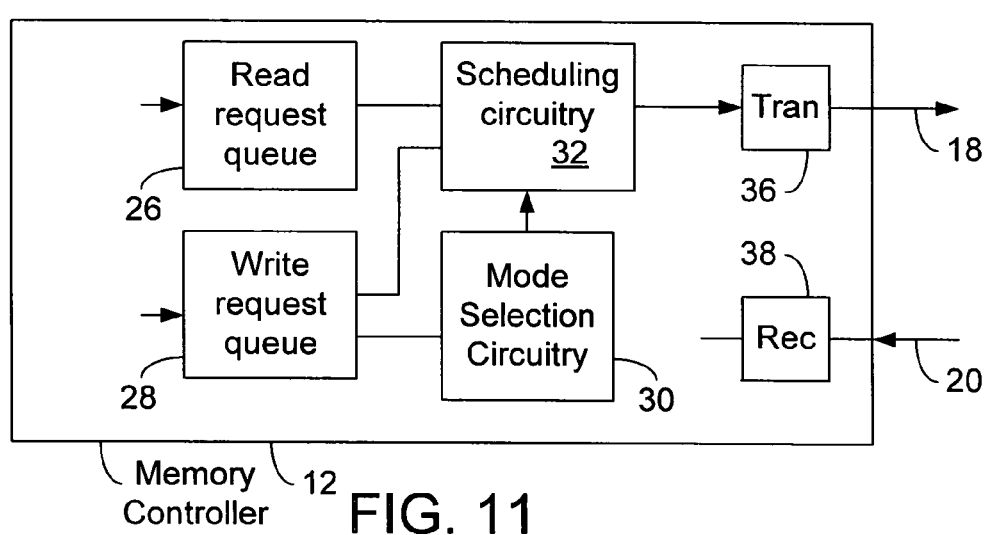

FIG. 11 is similar to FIG. 2 except that it does not include a separate monitoring circuitry 34, but mode selection circuitry 30 monitors the number of write requests in write request queue 28.

Figure 12:
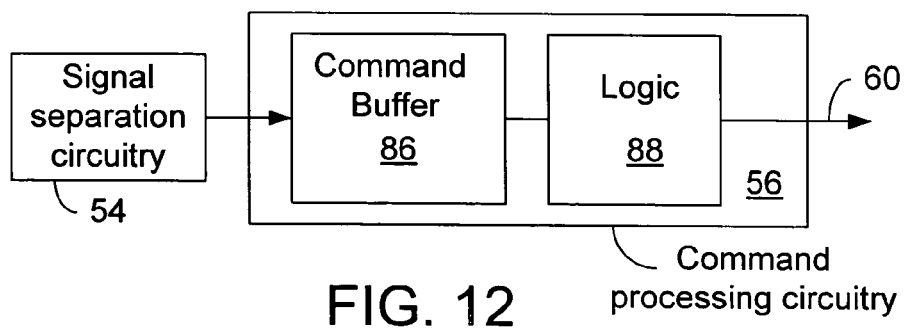
FIG. 12 is a block diagram representation of some details of a portion of FIG. 3 according to some embodiments of the inventions.

FIG. 12 shows additional details of some embodiments of command processing circuitry 56 of FIG. 3, but in other embodiments, the circuitry is different and additional circuitry may be included in the embodiments of FIG. 12. In FIG. 12, command processing circuitry 56 includes a command buffer 86 to hold commands and logic 88 to determine whether the command is a consolidated command and, if so, which single commands to translate it into.

Figure 13:
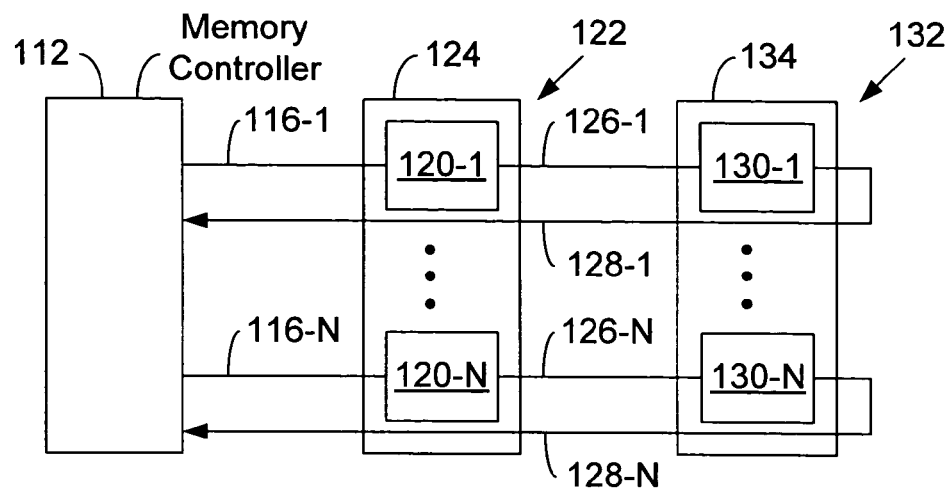

Memory controller 12 and memory device 14 may be provided in a variety of systems. Each memory device may be a separate chip or more than one memory device may be included in a chip. Referring to FIG. 13, memory controller 112 may be identical to or different than memory controller 12. Memory devices 120-1 . . . 120-N may be identical to or different than memory device 14. In some embodiments, memory devices 120-1 . . . 120-N are each separate chips included on a substrate 124 of a memory module 122. The chips may be included on one side or each side of substrate 124. Memory devices 130-1 . . . 130-N are on a substrate 134 of a memory module 132. Conductors 116-1 . . . 116-N carry various signals between memory controller 112 and memory devices 120-1 . . . 120-N. Conductors 126-1 . . . 126-N carry various signals between memory devices 120-1 . . . 120-N and memory devices 130-1 . . . 130-N. In some embodiments, conductors 128-1 . . . 128-N provides signals from memory devices 130-1 . . . 130-N to memory controller 12 in a looped fashion, but this not required. There may be additional conductors that are not illustrated.

In some embodiments, conductors 116-1 . . . 116-N and 126-1 . . . 126-N include unidirectional conductors in each direction (like in FIG. 1) and, in other embodiments, they include only unidirectional conductors with signals in a direction away from memory controller 112. In other embodiments, they include some bidirectional conductors. Signals can be sent from memory controller 112 to memory devices 120-1 . . . 120-N and then repeated by memory devices 120-1 . . . 120-N to memory devices 130-1 . . . 130-N. Each of conductors 116-1 . . . 116-N, 126-1 . . . 126-N, and 128-1 . . . 128-N include multiple lanes, which may be one or two conductors each. In other some embodiments, instead of memory devices 120-1 . . . 120-N being on a substrate of a memory module, they are on the motherboard. In this case, substrate 124 could represent the motherboard, rather than the substrate of a memory module. Where FIG. 13 or the other figures shows a single memory device, there may be a chain of memory devices. The systems may include stacked memory devices.

Figure 14:
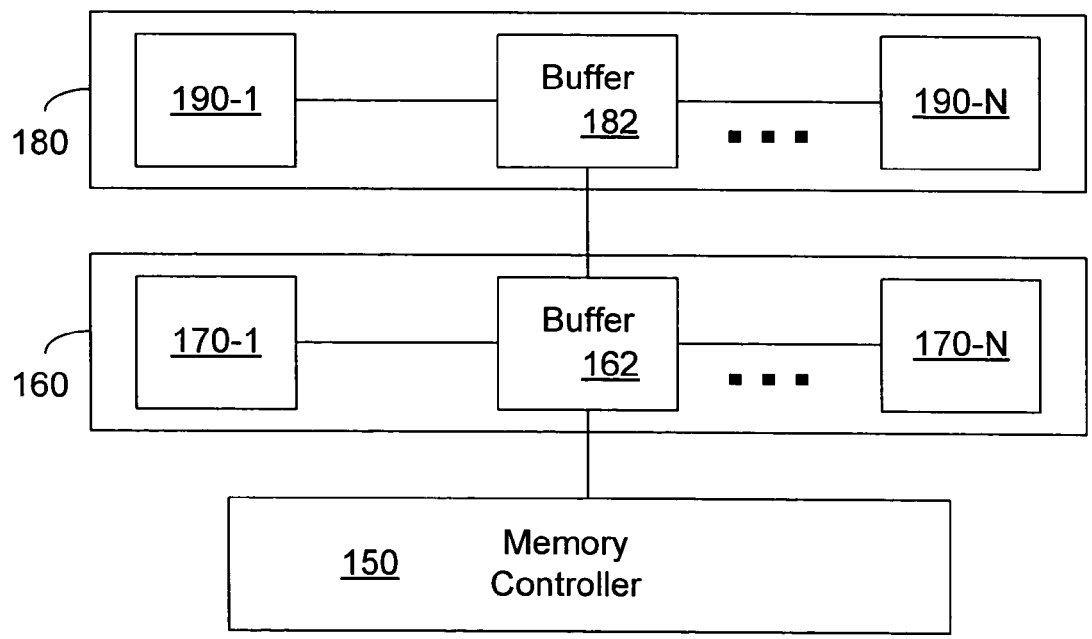

FIG. 14 illustrates a system in which memory devices 170-1 . . . 170-N are on a memory module substrate 160 and memory devices 190-1 . . . 190-N are on a memory module substrate 180. Each of these memory devices may be identical to or different than memory device 14. A memory controller 150 may be identical to or different than memory controller 12. In some embodiments, memory controller 150 and memory devices 170-1 . . . 170-N communicate through buffer 162 and memory controller 150 and memory devices 190-1 . . . 190-N communicate through buffers 162 and 182. In such a buffered system, the memory controller can use different signaling with the buffer than the buffer uses with the memory devices. Some embodiments may include additional conductors not shown in FIG. 14.

FIG. 15 illustrates first and second channels 206 and 216 coupled to a memory controller 202, which may be identical to or different than memory controller 12. Channels 206 and 216 are coupled to memory modules 208 and 218, respectively, that include memory devices such as are described herein.

In FIG. 16, a memory controller 252 (which represents any of previously mentioned memory controllers) is included in a chip 250, which also includes one or more processor cores 254. An input/output controller chip 256 is coupled to chip 250 and is also coupled to a wireless transmitter circuitry and wireless receiver circuitry 258. In FIG. 17, memory controller 252 is included in a hub chip 274. Hub chip 274 is coupled between a chip 270 (which includes one or more processor cores 272) and an input/output controller chip 278. I/O controller chip 278 is coupled to wireless transmitter circuitry and wireless receiver circuitry 258.

Additional Information and Embodiments

The inventions are not limited to the interconnections between chips illustrated in FIG. 1. In an alternative system, memory controller 12 is coupled to memory device 14 through link 18, but link 20 is coupled to a next memory device (for example, like memory device 130-1 in FIG. 13) instead of to memory controller 12. The read data are provided to memory controller 12 through other conductors (such as 128-1 in FIG. 13.) Still other arrangements may be used.

There may be single or consolidated commands in addition to those described herein. In some embodiments, there may be some consolidated commands (not specifically described in this disclosure) that occur in both the first or second modes.

The inventions are not restricted to any particular signaling techniques or protocols. For example, the signaling may be single ended or differential. The signaling may include only two voltage levels or more than two voltage levels. The signaling may be single data rate, double data rate, quad data rate, or octal data. The signaling may involve encoded symbols and/or packetized signals. A clock (or strobe) signal may be transmitted separately from the signals or embedded in the signals. Various coding techniques may be used. The inventions are not restricted to a particular type of transmitters and receivers. Various clocking techniques could be used in the transmitters and receivers and other circuits. The receiver symbols in the figures may include both the initial receiving circuits and related latching and clocking circuits. The conductors between chips each could be point-to-point or each could be in a multi-drop arrangement, or some could be point-to-point while others are a multi-drop arrangement.

In the figures showing one or more modules, there may be one or more additional modules in parallel and/or in series with the shown modules.

In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
a link interface;
monitoring circuitry to provide a link activity indicator that is indicative of activity of a link coupled to the link interface;
scheduling circuitry to schedule commands to be transmitted by the link interface; and
mode selection circuitry to select a first mode if the link activity indicator is in a first range, to select a second mode if the link activity indicator is in a second range, and to select a third mode if the link activity indicator is in a third range, wherein in the first mode the scheduling circuitry schedules certain of the commands as separate single commands, in the second mode the scheduling circuitry schedules at least one consolidated command, and in the third mode the scheduling circuitry schedules at least one additional consolidated command that is not scheduled in the second mode, wherein each of the consolidated commands is a command that represents more than one of the separate single commands.

2. The chip of claim 1, wherein the at least one consolidated command includes a precharge/activate command that represents separate precharge and activate commands.

3. The chip of claim 1, wherein the at least one consolidated command includes activate/read command and activate/write commands that represent separate activate and read commands and activate and write commands.

4. The chip of claim 1, wherein the link interface includes transmitters to transmit scheduled signals to the link and wherein the activity indicator represents a monitored link utilization using a moving average window filter.

5. The chip of claim 1, wherein the at least one consolidated command includes a precharge/activate/read command and a precharge/activate/write command that represent separate precharge, activate, and read commands and precharge, activate, and write commands.

6. The chip of claim 1, further comprising transmitters to transmit signals from the scheduling circuitry to a link.

7. The chip of claim 6, wherein the activity indicator represents a monitored link utilization using a moving average window filter.

8. The chip of claim 6, wherein the activity indicator represents a time interval since a most recently scheduled command.

9. The chip of claim 6, wherein the activity indicator represents a number of commands scheduled to be transmitted by the transmitters per unit time.

10. The chip of claim 1, wherein the first mode is a default mode and wherein in the first mode, the scheduling circuitry performs just in time scheduling.

11. The chip of claim 1, further comprising a write request queue, and wherein the activity indicator is a measure of how full the write request queue is at a particular time.

12. The chip of claim 1, wherein a read command without a preceding activate command is not consolidated whether the scheduling circuitry is in the first mode, second mode, or third mode.

13. The chip of claim 1, wherein a precharge command is not consolidated whether the scheduling circuitry is in the first mode, second mode, or third mode.

14. The chip of claim 1, wherein at least one different consolidated command is scheduled whether the scheduling circuitry is in the first mode, second mode, or third mode.

15. A system comprising:
a first chip including:
(a) a link interface including transmitters;
(b) monitoring circuitry to provide an activity indicator that is indicative of activity of the chip;
(c) scheduling circuitry to schedule commands to be transmitted to the transmitters; and
(d) mode selection circuitry to select a first mode if the link activity indicator is in a first range, to select a second mode if the link activity indicator is in a second range, and to select a third mode if the link activity indicator is in a third range, wherein in the first mode the scheduling circuitry schedules certain of the commands as separate single commands, in the second mode the scheduling circuitry schedules at least one consolidated command, and in the third mode the scheduling circuitry schedules at least one additional consolidated command that is not scheduled in the second mode, wherein each of the consolidated commands is a command that represents more than one of the separate single commands;
a link coupled to the link interface of the first chip;
a second chip including:
(a) receivers coupled to the link to receive signals including the scheduled commands;
(b) command processing circuitry to translate the at least one consolidated commands into separate single commands; and
(c) a memory core to receive at least some of the separate single commands.

16. The system of claim 15, wherein the at least one consolidated command includes a precharge/activate command that represents separate precharge and activate commands.

17. The system of claim 15, wherein the at least one consolidated command includes activate/read command and activate/write commands that represent separate activate and read commands and activate and write commands.

18. The system of claim 15, wherein the activity indicator represents a monitored link utilization using a moving average window filter.

19. The system of claim 15, wherein the activity indicator represents a time interval since a most recently scheduled command.

20. The system of claim 15, wherein the first chip includes at least one processor core.

21. The system of claim 15, wherein the first chip is coupled to wireless transmitter circuitry and wireless receiver circuitry.

* * * * *